United States Patent
Scahill et al.

(10) Patent No.: US 12,137,383 B2
(45) Date of Patent: Nov. 5, 2024

(54) MEASURING CHANNEL PERFORMANCE IN WIRELESS LOCAL AREA NETWORKS

(71) Applicant: BRITISH TELECOMMUNICATIONS PUBLIC LIMITED COMPANY, London (GB)

(72) Inventors: Francis Scahill, London (GB); Simon Ringland, London (GB)

(73) Assignee: British Telecommunications Public Limited Company (GB)

( * ) Notice: Subject to any disclaimer, the term of this patent is extended or adjusted under 35 U.S.C. 154(b) by 450 days.

(21) Appl. No.: 17/309,041

(22) PCT Filed: Oct. 3, 2019

(86) PCT No.: PCT/EP2019/076815
§ 371 (c)(1),
(2) Date: Apr. 16, 2021

(87) PCT Pub. No.: WO2020/078730
PCT Pub. Date: Apr. 23, 2020

(65) Prior Publication Data
US 2022/0038973 A1 Feb. 3, 2022

(30) Foreign Application Priority Data
Oct. 16, 2018 (EP) .................................. 18200662

(51) Int. Cl.
*H04W 36/06* (2009.01)
*H04W 24/08* (2009.01)
(Continued)

(52) U.S. Cl.
CPC ........... *H04W 36/06* (2013.01); *H04W 24/08* (2013.01); *H04W 36/08* (2013.01); *H04W 84/12* (2013.01)

(58) Field of Classification Search
CPC ..... H04W 36/06; H04W 24/08; H04W 36/08; H04W 84/12; H04W 24/10
See application file for complete search history.

(56) References Cited

U.S. PATENT DOCUMENTS 6,021,314 A * 2/2000 Magana ................ H04W 36/06
455/226.1
6,694,141 B1 2/2004 Pulkkinen et al.
(Continued)

FOREIGN PATENT DOCUMENTS

CN 103297632 A 9/2013
CN 103583065 A 2/2014
(Continued)

OTHER PUBLICATIONS

J.-P. Jeong, Y. D. Park and Y.-J. Suh, "An Efficient Channel Scanning Scheme With Dual-Interfaces for Seamless Handoff in IEEE 802.11 WLANs," in IEEE Communications Letters, vol. 22, No. 1, pp. 169-172, Jan. 2018, doi: 10.1109/LCOMM.2017.2763941. ( Year: 2018).*

(Continued)

*Primary Examiner* — Ayaz R Sheikh
*Assistant Examiner* — Tarell A Hampton
(74) *Attorney, Agent, or Firm* — PRANGER LAW PC

(57) ABSTRACT

There is herein disclosed a method of measuring the performance of a first communication channel at a first access point in a WLAN, in which the first access point is associated to a client device so that the first access point can send data to, and/or receive data from, the client device on a second communication channel, the method including disassociating the first access point to the client device and associating a second access point to the client device; switching the working channel of the first access point from the second communication channel to the first communication channel; and making one or more performance mea- (Continued)

surements in respect of the first communication channel at the first access point.

14 Claims, 4 Drawing Sheets

(51) Int. Cl.
*H04W 36/08* (2009.01)
*H04W 84/12* (2009.01)

(56) References Cited

U.S. PATENT DOCUMENTS

| | | | |
|---|---|---|---|
| 7,965,686 B1* | 6/2011 | Bridge | H04W 48/20 370/332 |
| 8,228,807 B2* | 7/2012 | Tsai | H04W 36/0094 455/450 |
| 8,392,712 B1 | 3/2013 | Wilson | |
| 8,576,812 B2 | 11/2013 | Gray et al. | |
| 8,649,418 B1 | 2/2014 | Negus et al. | |
| 8,711,768 B2 | 4/2014 | Viswanath | |
| 8,805,374 B2 | 8/2014 | Zhu et al. | |
| 9,319,959 B2 | 4/2016 | White et al. | |
| 9,392,536 B2 | 7/2016 | Shukla et al. | |
| 9,420,510 B1 | 8/2016 | Surmay et al. | |
| 9,775,164 B2 | 9/2017 | Amini et al. | |
| 9,853,899 B2 | 12/2017 | Ringland et al. | |
| 9,883,436 B2 | 1/2018 | Brown et al. | |
| 10,015,686 B2 | 7/2018 | Townend et al. | |
| 10,070,345 B2 | 9/2018 | Townend et al. | |
| 10,075,961 B2 | 9/2018 | Nekovee | |
| 10,123,241 B2 | 11/2018 | Brown et al. | |
| 10,142,919 B2 | 11/2018 | Brown et al. | |
| 10,225,775 B2 | 3/2019 | Townend | |
| 10,231,177 B2 | 3/2019 | Ringland et al. | |
| 10,356,706 B2 | 7/2019 | Ringland et al. | |
| 10,477,591 B2 | 11/2019 | Jung et al. | |
| 11,064,319 B2 | 7/2021 | Amini et al. | |
| 2001/0055285 A1 | 12/2001 | Tomoike | |
| 2002/0165563 A1 | 11/2002 | Grant et al. | |
| 2002/0181417 A1 | 12/2002 | Malhotra et al. | |
| 2003/0123420 A1 | 7/2003 | Sherlock | |
| 2003/0134638 A1 | 7/2003 | Sundar et al. | |
| 2003/0161341 A1 | 8/2003 | Wu et al. | |
| 2004/0151137 A1* | 8/2004 | McFarland | H04W 72/02 370/341 |
| 2004/0165563 A1 | 8/2004 | Hsu et al. | |
| 2005/0003857 A1 | 1/2005 | Sylvain | |
| 2005/0047343 A1 | 3/2005 | Sharony et al. | |
| 2005/0059400 A1 | 3/2005 | Jagadeesan et al. | |
| 2005/0063334 A1* | 3/2005 | Fnu | H04W 48/16 370/329 |
| 2005/0090259 A1 | 4/2005 | Jain et al. | |
| 2005/0271009 A1 | 12/2005 | Shirakabe et al. | |
| 2005/0271021 A1 | 12/2005 | Alemany et al. | |
| 2006/0092883 A1 | 5/2006 | Lee et al. | |
| 2006/0111112 A1 | 5/2006 | Maveddat | |
| 2006/0116127 A1 | 6/2006 | Wilhoite et al. | |
| 2006/0146709 A1 | 7/2006 | Ginzburg | |
| 2006/0217147 A1 | 9/2006 | Olvera-Hernandez et al. | |
| 2006/0240828 A1 | 10/2006 | Jain et al. | |
| 2007/0008928 A1 | 1/2007 | Kezys | |
| 2007/0086378 A1* | 4/2007 | Matta | H04W 48/12 370/329 |
| 2007/0105544 A1 | 5/2007 | Veres et al. | |
| 2007/0124478 A1 | 5/2007 | Abdelhamid et al. | |
| 2007/0291711 A1 | 12/2007 | Welch et al. | |
| 2008/0008140 A1 | 1/2008 | Forssell | |
| 2008/0049738 A1 | 2/2008 | Joung et al. | |
| 2008/0080387 A1 | 4/2008 | Wang et al. | |
| 2008/0080388 A1 | 4/2008 | Dean et al. | |
| 2008/0117836 A1 | 5/2008 | Savoor et al. | |
| 2008/0151751 A1 | 6/2008 | Ponnuswamy et al. | |
| 2008/0159207 A1 | 7/2008 | Levine et al. | |
| 2008/0186917 A1* | 8/2008 | Wu | H04W 36/10 370/331 |
| 2008/0253314 A1 | 10/2008 | Stephenson et al. | |
| 2008/0291915 A1 | 11/2008 | Foschiano | |
| 2009/0010222 A1 | 1/2009 | Jechoux | |
| 2009/0046655 A1 | 2/2009 | Zhao et al. | |
| 2009/0116443 A1 | 5/2009 | Walker et al. | |
| 2009/0154363 A1 | 6/2009 | Stephens | |
| 2009/0161610 A1 | 6/2009 | Kang et al. | |
| 2009/0196233 A1* | 8/2009 | Zhu | H04W 92/04 370/328 |
| 2009/0215438 A1 | 8/2009 | Mittal et al. | |
| 2009/0225742 A1* | 9/2009 | Chu | H04W 48/12 370/349 |
| 2009/0264123 A1 | 10/2009 | Agashe et al. | |
| 2009/0286534 A1 | 11/2009 | Garg et al. | |
| 2009/0310501 A1 | 12/2009 | Catovic et al. | |
| 2010/0003921 A1 | 1/2010 | Godlewski et al. | |
| 2010/0080196 A1 | 4/2010 | Ho et al. | |
| 2010/0091651 A1 | 4/2010 | Chin et al. | |
| 2010/0157864 A1* | 6/2010 | Salomone | H04W 48/16 370/311 |
| 2010/0246419 A1* | 9/2010 | Batta | H04W 64/00 370/252 |
| 2010/0246524 A1 | 9/2010 | Kayama et al. | |
| 2010/0255794 A1 | 10/2010 | Agnew | |
| 2011/0002466 A1 | 1/2011 | Kwak et al. | |
| 2011/0096739 A1 | 4/2011 | Heidari et al. | |
| 2011/0243013 A1 | 10/2011 | Lee et al. | |
| 2011/0286329 A1* | 11/2011 | Koo | H04W 48/12 370/232 |
| 2011/0292822 A1 | 12/2011 | Wood et al. | |
| 2011/0305180 A1 | 12/2011 | Oesterling | |
| 2011/0312330 A1 | 12/2011 | Sadek et al. | |
| 2012/0044888 A1* | 2/2012 | Adling | H04W 16/14 455/62 |
| 2012/0060198 A1 | 3/2012 | Tremblay et al. | |
| 2012/0082049 A1 | 4/2012 | Chen et al. | |
| 2012/0088535 A1 | 4/2012 | Wang et al. | |
| 2012/0134280 A1 | 5/2012 | Rotvold et al. | |
| 2012/0170548 A1 | 7/2012 | Rajagopalan et al. | |
| 2012/0224484 A1 | 9/2012 | Babiarz et al. | |
| 2012/0252510 A1 | 10/2012 | Wang et al. | |
| 2012/0269182 A1 | 10/2012 | Walker | |
| 2012/0314571 A1 | 12/2012 | Forssell | |
| 2012/0315905 A1 | 12/2012 | Zhu et al. | |
| 2012/0324100 A1 | 12/2012 | Tomici et al. | |
| 2013/0016648 A1* | 1/2013 | Koskela | H04W 92/20 370/315 |
| 2013/0053023 A1 | 2/2013 | Meredith et al. | |
| 2013/0058310 A1 | 3/2013 | Park et al. | |
| 2013/0102313 A1 | 4/2013 | Tinnakornsrisuphap et al. | |
| 2013/0121145 A1 | 5/2013 | Draznin et al. | |
| 2013/0157688 A1 | 6/2013 | Kateley et al. | |
| 2013/0223272 A1 | 8/2013 | Tao et al. | |
| 2013/0242966 A1 | 9/2013 | Tinnakornsrisuphap et al. | |
| 2013/0294263 A1 | 11/2013 | Haga et al. | |
| 2013/0295989 A1 | 11/2013 | Smadi et al. | |
| 2013/0324125 A1 | 12/2013 | Bachmann et al. | |
| 2014/0080491 A1 | 3/2014 | Tinnakornsrisuphap et al. | |
| 2014/0118462 A1 | 5/2014 | Zhao et al. | |
| 2014/0177600 A1 | 6/2014 | Tsai et al. | |
| 2014/0258509 A1 | 9/2014 | Raghuraman et al. | |
| 2014/0313888 A1 | 10/2014 | Linkola et al. | |
| 2014/0315536 A1 | 10/2014 | Chow et al. | |
| 2014/0321298 A1 | 10/2014 | Chow et al. | |
| 2014/0323087 A1 | 10/2014 | Huang et al. | |
| 2014/0334465 A1 | 11/2014 | Lee et al. | |
| 2015/0051872 A1 | 2/2015 | Arora et al. | |
| 2015/0071166 A1 | 3/2015 | Malhotra et al. | |
| 2015/0117209 A1 | 4/2015 | Lee et al. | |
| 2015/0131619 A1 | 5/2015 | Zhu et al. | |
| 2015/0181416 A1 | 6/2015 | Dominguez Romero et al. | |
| 2015/0189556 A1 | 7/2015 | Sidhu et al. | |
| 2015/0201363 A1 | 7/2015 | Lundqvist et al. | |
| 2015/0215832 A1 | 7/2015 | Fitzpatrick | |
| 2015/0282013 A1 | 10/2015 | Kim et al. | |
| 2015/0312857 A1 | 10/2015 | Kim et al. | |

(56) References Cited

U.S. PATENT DOCUMENTS

| | | |
|---|---|---|
| 2016/0043953 A1 | 2/2016 | Ringland et al. |
| 2016/0044568 A1 | 2/2016 | White et al. |
| 2016/0050602 A1 | 2/2016 | Cui et al. |
| 2016/0057290 A1 | 2/2016 | Punwani et al. |
| 2016/0057676 A1 | 2/2016 | White et al. |
| 2016/0066227 A1 | 3/2016 | Townend |
| 2016/0073286 A1 | 3/2016 | Wang et al. |
| 2016/0095050 A1 | 3/2016 | Lindheimer et al. |
| 2016/0095110 A1 | 3/2016 | Li et al. |
| 2016/0095129 A1 | 3/2016 | Höyhtyä et al. |
| 2016/0157239 A1 | 6/2016 | Kalderen et al. |
| 2016/0165508 A1 | 6/2016 | Jin |
| 2016/0165518 A1 | 6/2016 | Keller et al. |
| 2016/0165532 A1 | 6/2016 | Nagasaka et al. |
| 2016/0174110 A1 | 6/2016 | Sharma et al. |
| 2016/0183085 A1 | 6/2016 | Yerrabommanahalli et al. |
| 2016/0183181 A1* | 6/2016 | Lee ................. H04W 48/20 370/338 |
| 2016/0295385 A1 | 10/2016 | Wang et al. |
| 2016/0302096 A1 | 10/2016 | Chari et al. |
| 2016/0316425 A1 | 10/2016 | Cili et al. |
| 2016/0337904 A1 | 11/2016 | Hsu et al. |
| 2016/0345256 A1 | 11/2016 | Niranjan et al. |
| 2016/0347298 A1 | 12/2016 | Jung |
| 2016/0373989 A1 | 12/2016 | Tinnakornsrisuphap et al. |
| 2016/0380686 A1 | 12/2016 | Da Silva et al. |
| 2017/0006479 A1 | 1/2017 | Smith et al. |
| 2017/0006504 A1 | 1/2017 | Townend et al. |
| 2017/0034807 A1* | 2/2017 | Lumbatis ............. H04L 65/61 |
| 2017/0111807 A1 | 4/2017 | Townend et al. |
| 2017/0111813 A1 | 4/2017 | Townend et al. |
| 2017/0118091 A1 | 4/2017 | Townend et al. |
| 2017/0134261 A1 | 5/2017 | Seo et al. |
| 2017/0142752 A1 | 5/2017 | Schmidt |
| 2017/0164195 A1 | 6/2017 | Stammers et al. |
| 2017/0181059 A1 | 6/2017 | Townend et al. |
| 2017/0272310 A1* | 9/2017 | Rengarajan ........... H04L 41/142 |
| 2017/0272317 A1 | 9/2017 | Singla et al. |
| 2017/0272995 A1 | 9/2017 | Kim et al. |
| 2017/0289894 A1 | 10/2017 | Palm et al. |
| 2017/0347298 A1 | 11/2017 | Brown et al. |
| 2017/0359732 A1 | 12/2017 | Ganu et al. |
| 2017/0374597 A1 | 12/2017 | Ray et al. |
| 2018/0084471 A1* | 3/2018 | Emmanuel ............. H04W 24/06 |
| 2018/0091967 A1 | 3/2018 | Gupta |
| 2018/0092140 A1 | 3/2018 | Dong et al. |
| 2018/0124630 A1 | 5/2018 | Ringland et al. |
| 2018/0132149 A1 | 5/2018 | Zhao et al. |
| 2018/0139692 A1 | 5/2018 | Liu et al. |
| 2018/0176792 A1 | 6/2018 | Egner et al. |
| 2018/0254979 A1 | 9/2018 | Scahill et al. |
| 2018/0270677 A1 | 9/2018 | Brisebois et al. |
| 2018/0317275 A1 | 11/2018 | Chang et al. |
| 2019/0014519 A1 | 1/2019 | Brown et al. |
| 2019/0037339 A1 | 1/2019 | Liu et al. |
| 2019/0069328 A1 | 2/2019 | Sharma |
| 2019/0110242 A1 | 4/2019 | Islam et al. |
| 2019/0116540 A1 | 4/2019 | Faus Gregori |
| 2019/0124559 A1 | 4/2019 | Brown et al. |
| 2019/0215821 A1 | 7/2019 | Dillon |
| 2019/0230132 A1 | 7/2019 | Brown et al. |
| 2020/0008048 A1 | 1/2020 | Takahashi |
| 2020/0107255 A1 | 4/2020 | Cuevas Ramirez |
| 2020/0154322 A1* | 5/2020 | Liu ................. H04W 76/11 |
| 2020/0236595 A1 | 7/2020 | Cuevas Ramirez et al. |
| 2020/0322832 A1 | 10/2020 | Jamin et al. |
| 2021/0022148 A1 | 1/2021 | Ringland et al. |
| 2021/0029548 A1 | 1/2021 | Ringland et al. |
| 2021/0400514 A1 | 12/2021 | Scahill et al. |

FOREIGN PATENT DOCUMENTS

| | | |
|---|---|---|
| CN | 104684039 A | 6/2015 |
| CN | 105554855 A | 5/2016 |
| CN | 105722060 A | 6/2016 |
| CN | 105917707 A | 8/2016 |
| CN | 106028409 A | 10/2016 |
| CN | 106134252 A | 11/2016 |
| CN | 106161802 A | 11/2016 |
| CN | 106358254 A | 1/2017 |
| EP | 1096730 A1 | 5/2001 |
| EP | 2424281 A1 | 2/2012 |
| EP | 2477435 A1 | 7/2012 |
| EP | 2482490 A1 | 8/2012 |
| EP | 2530875 A1 | 12/2012 |
| EP | 2632071 A1 | 8/2013 |
| EP | 2680494 A1 | 1/2014 |
| EP | 2720409 A1 | 4/2014 |
| EP | 2900016 A1 | 7/2015 |
| EP | 2925056 A2 | 9/2015 |
| EP | 2025106 B9 | 7/2016 |
| JP | 2017130777 A | 7/2017 |
| WO | 2004102919 A1 | 11/2004 |
| WO | 2006138019 A2 | 12/2006 |
| WO | 2007076147 A2 | 7/2007 |
| WO | 2008008990 A2 | 1/2008 |
| WO | 2009143196 A2 | 11/2009 |
| WO | 2012145706 A1 | 10/2012 |
| WO | 2015150745 A1 | 10/2015 |
| WO | 2016004968 A1 | 1/2016 |
| WO | 2016032615 A1 | 3/2016 |
| WO | WO-2016049033 A1 | 3/2016 |
| WO | 2016156439 A1 | 10/2016 |
| WO | 2017114932 A1 | 7/2017 |
| WO | WO-2017161361 A2 | 9/2017 |
| WO | 2017167694 A1 | 10/2017 |
| WO | 2017167701 A1 | 10/2017 |
| WO | 2018002130 A1 | 1/2018 |
| WO | WO-2018134679 A1 | 7/2018 |
| WO | 2018178241 A1 | 10/2018 |
| WO | 2018178293 A1 | 10/2018 |
| WO | 2018178294 A1 | 10/2018 |
| WO | 2018234037 A1 | 12/2018 |
| WO | 2018234038 | 12/2018 |
| WO | 2022033852 A1 | 2/2022 |

OTHER PUBLICATIONS

International Search Report and Written Opinion for Application No. PCT/EP2019/076815, mailed on Jan. 8, 2020, 17 pages.
International Search Report and Written Opinion for Application No. PCT/EP2019/076828, mailed on Jan. 8, 2020, 16 pages.
Office Action For GB Application No. 1816805.4, mailed on Jan. 27, 2021, 4 pages.
Office Action For GB Application No. 1816806.2, mailed on Jan. 27, 2021, 4 pages.
Yao G., et al., "OppoScan: Enabling Fast Handoff in Dense 802.11WMNs via Opportunistic Probing with Virtual Radio," 2017 IEEE 14th International Conference on Mobile Ad Hoc and Sensor Systems, 8 pages.
3GPP TR 37.834 V0.4.0, (Aug. 2013), 3rd Generation Partnership Project; Technical Specification Group Radio Access Network; Study on WLAN/3GPP Radio Interworking (Release 12), XP050816244, May 15, 2014, 14 pages.
3GPP TS 22.173 V7.3.0, (Mar. 2007), 3rd Generation Partnership Project (3GPP); Technical Specification Group Services and System Aspects; IP Multimedia Core Network Subsystem (IMS) Multimedia Telephony Service and supplementary services Stage 1; (Release 7), 2007, 10 pages.
3GPP TS 23.402 V13.4.0 (Dec. 2015), 3rd Generation Partnership Project; Technical Specification Group Services and System Aspects; Architecture enhancements for non-3GPP accesses (Release 13), 650 Route des Lucioles -Sophia Antipolis Valbonne, Dec. 2015, 298 pages.
Alcatel-Lucent, Policy Based Terminal Triggered, ANDSF Decided Access Selection, 3GPP draft, S2-081355_ANDSF discussion, Mobile Competence Centre, Athens, Greece, vol. SA WG2, Feb. 8, 2008, 5 pages.
Alcatel-Lucent, Policy Based Terminal Triggered, ANDSF Decided Access Selection, 3GPP draft, S2-081658_ANDSF discussion, 3rd

(56) References Cited

OTHER PUBLICATIONS

Generation Partnership Project (3GPP), Mobile Competence Centre, 650, Route DES Lucioles, F-06921 Sophia Antipolis Cedex, France, vol. SA WG2, Athens, XP050263998, Feb. 16, 2008, 6 pages.
Veres, et al., Supporting Service Differentiation in Wireless Packet Networks Using Distributed Control, IEEE Journal on Selected Areas in Communications, IEEE Service Center, Oct. 1, 2001, pp. 2081-2093.
Wikipedia, IEEE 802.11 e-2005, Retrieved from http://en.wikipedia.org/wiki/IEEE 802.11 e-2005, Sep. 28, 2015, 4 pages.
Bhadane, et al., Improving Fast and Smooth Handoff in IEEE 802.11 Wireless Networks, IJRIM, ISSN: 2231-4334, vol. 2(2), Feb. 2012, 9 pages.
Broadband Forum, Technical Report TR-069 CPE WAN Management Protocol, issue: 1 Amendment 5, CWMP Version: 1.4, Nov. 2013, 228 pages.
BT Wi-Fi, Retrieved from https://www.bt.com/btfon, Sep. 28, 2015, 2 pages.
Claise, E. B., CISCO Systems NetFlow Services Export Version 9, from https://www.ietf.org/rfc/rfc3954.txt retrieved on Feb. 22, 2018, Oct. 9, 2004, 29 pages.
Combined Search and Examination Report for GB application No. 1705262.2, dated Oct. 12, 2017, 4 pages.
Combined Search and Examination Report for Great Britain Application No. 1710043.9, mailed on Nov. 20, 2017, 5 pages.
Combined Search and Examination Report under Sections 17 and 18(3) for Great Britain Application No. 1705248.1, mailed on Aug. 25, 2017, 6 pages.
Combined Search and Examination Report under Sections 17 and 18(3) for Great Britain Application No. GB1705257.2, mailed on Aug. 17, 2017, 2 pages.
Communication pursuant to Article 94(3) EPC For European Application No. 18713692.4, mailed on Dec. 22, 2020, 7 pages.
Distributed Coordination Function, Retrieved from http://en.wikipedia.org/wiki/Distributed-Coordination Function, Sep. 28, 2015, 2 pages.
Ericsson, Wi-Fi calling—extending the reach of VoLTE to Wi-Fi, XP055251865, retrieved on Dec. 26, 2018, Jan. 30, 2015, 5 pages.
Eronen, E., RFC 4555—IKEv2 Mobility and Multihoming Protocol (MOBIKE), Nokia, Network Working Group Request for Comments, 4555, Category, Standards Track, XP055299729, Jun. 2006, 34 pages.
Examination report for European Application No. 197711620.5, mailed on Dec. 22, 2022, 7 pages.
Examination Report for Great Britain Application No. 1710043.9, mailed on Sep. 25, 2019, 2 pages.
Examination Report for Great Britain Application No. 1710046.2, mailed on Sep. 26, 2019, 3 pages.
Examination Report under section 18(3) for Great Britain Application No. 1805250.6, mailed on Jul. 20, 2020, 3 pages.
Examination Report under section 18(3) for Great Britain Application No. 1805260.5, mailed on Jul. 7, 2020, 3 pages.
Examination Report under section 18(3) for Great Britain Application No. 2013247.8, mailed on Oct. 13, 2021, 7 pages.
Extended European Search Report for Application No. 13250034.9, mailed on Sep. 12, 2013, 9 pages.
Extended European Search Report for Application No. 13250043.0, mailed on Nov. 7, 2013, 5 pages.
Extended European Search Report for Application No. 17164395.0, mailed on Sep. 22, 2017, 17 pages.
Extended European Search Report for Application No. 17177601.6, mailed on Nov. 17, 2017, 12 pages.
Extended European Search Report for Application No. 18165198.5, mailed on Sep. 14, 2018, 7 pages.
Extended European Search Report for Application No. 18165202.5, mailed on Sep. 17, 2018, 10 pages.
Huawei, How solutions 1, 2 and 3 work without ANDSF, RAN WG2 #83bis, R2-133444, Ljubljana, Slovenia, Oct. 7-11, 2013, 5 pages.
International Preliminary Report on Patentability for Application No. PCT/EP2016/082894, mailed on Jul. 3, 2018, 9 pages.
International Preliminary Report on Patentability for Application No. PCT/EP2017/057204, mailed on Oct. 2, 2018, 6 pages.
International Preliminary Report on Patentability for Application No. PCT/EP2017/057225, mailed on Oct. 2, 2018, 10 pages.
International Preliminary Report on Patentability for Application No. PCT/EP2018/058085, mailed on Oct. 10, 2019, 17 pages.
International Preliminary Report on Patentability for Application No. PCT/EP2018/058199, mailed on Oct. 10, 2019, 16 pages.
International Preliminary Report on Patentability for Application No. PCT/EP2018/058202, mailed on Oct. 10, 2019, 9 pages.
International Preliminary Report on Patentability for Application No. PCT/EP2018/064878, mailed on Jan. 2, 2020, 12 pages.
International Preliminary Report on Patentability for Application No. PCT/EP2018/064879, mailed on Jan. 2, 2020, 13 pages.
International Preliminary Report on Patentability for Application No. PCT/EP2019/076815, mailed on Apr. 29, 2021, 12 pages.
International Preliminary Report on Patentability for Application No. PCT/EP2019/076828, mailed on Apr. 29, 2021, 10 pages.
International Preliminary Report on Patentability for Application No. PCT/GB2014/000111, mailed on Oct. 8, 2015, 9 pages.
International Preliminary Report on Patentability for Application No. PCT/GB2014/000122, mailed on Oct. 8, 2015, 6 pages.
International Preliminary Report on Patentability for Application No. PCT/GB2014/053705, mailed on Jul. 14, 2016, 12 pages.
International Preliminary Report on Patentability for Application No. PCT/GB2015/050906, mailed Oct. 13, 2016, 9 pages.
International Preliminary Report on Patentability for Application No. PCT/GB2015/050907, mailed on Oct. 13, 2016, 8 pages.
International Preliminary Report on Patentability for Application No. PCT/GB2015/050908, mailed on Oct. 13, 2016, 8 pages.
International Preliminary Report on Patentability for PCT Application No. PCT/EP2017/065977 mailed on Jan. 1, 2019, 8 pages.
International Preliminary Report on Patentability received for PCT Patent Application No. PCT/EP2019/057371, mailed on Oct. 8, 2020, 8 pages.
International Preliminary Report on Patentability received for PCT Patent Application No. PCT/EP2019/057375, mailed on Oct. 8, 2020, 9 pages.
International Search Report and Written Opinion for Application No. PCT/EP2016/072803, mailed on Dec. 14, 2016, 11 pages.
International Search Report and Written Opinion for Application No. PCT/EP2016/082894, mailed on Feb. 17, 2017, 12 pages.
International Search Report and Written Opinion for Application No. PCT/EP2017/057204, mailed on Apr. 21, 2017, 9 pages.
International Search Report and Written Opinion for Application No. PCT/EP2017/057225, mailed on May 18, 2017, 13 pages.
International Search Report and Written Opinion for Application No. PCT/EP2018/058085, mailed on May 17, 2018, 19 pages.
International Search Report and Written Opinion for Application No. PCT/EP2018/064878, mailed on Jul. 3, 2018, 14 pages.
International Search Report and Written Opinion for Application No. PCT/EP2018/064879, mailed on Jul. 6, 2018, 17 pages.
International Search Report and Written Opinion for Application No. PCT/EP2019/057371, mailed on May 21, 2019, 12 pages.
International Search Report and Written Opinion for Application No. PCT/EP2019/057375 mailed May 21, 2019, 15 pages.
International Search Report and Written Opinion for Application No. PCT/GB2014/000111, mailed on Jun. 6, 2014, 11 pages.
International Search Report and Written Opinion for Application No. PCT/GB2014/000122, mailed on May 6, 2014, 7 pages.
International Search Report and Written Opinion for Application No. PCT/GB2014/053705, mailed on Mar. 9, 2015, 13 pages.
International Search Report and Written Opinion for Application No. PCT/GB2015/050906 mailed Jun. 18, 2015, 11 pages.
International Search Report and Written Opinion for Application No. PCT/GB2015/050907, mailed on Jun. 3, 2015, 10 pages.
International Search Report and Written Opinion for Application No. PCT/GB2015/050908, mailed on Jun. 15, 2015, 10 pages.
International Search Report and Written Opinion for PCT Application No. PCT/EP2017/065977 mailed on Sep. 6, 2017, 10 pages.

(56) References Cited

OTHER PUBLICATIONS

International Search Report and Written Opinion for PCT Patent Application No. PCT/EP2018/058199, mailed on May 17, 2018, 18 pages.
International Search Report and Written Opinion for PCT Patent Application No. PCT/EP2018/058202, mailed on May 2, 2018, 11 pages.
International Search Report for Application No. PCT/GB2014/000123, mailed on May 6, 2014, 4 pages.
International Telecommunications, Union, G.hn Management and Diagnostics Specifications, Study Period 2009-2012, Study Group 15—Contribution 807, May 2010, 12 pages.
Jiang, et al., Proportional Fairness in Wireless LANs and Ad Hoc Networks, IEEE Wireless Communications and Networking Conference, 2005, 6 pages.
Kajita, et al., A Channel Selection Strategy for WLAN in Urban Areas by Regression Analysis, IEEE, 10th International Conference on Wireless and Mobile Computing, Networking and Communication, 2014, pp. 642-647.
Kaufman, et al., RFC 7296—Internet Key Exchange Protocol Version 2 (KIEv2), retrieved from the internet http://tools.ietf.org/html/rfc7296#page-58, Oct. 1, 2014, 143 pages.
Leith, et al., A Self-Managed Distributed Channel Selection Algorithm for WLANs, Modeling and Optimization in Mobile, Ad Hoc and Wireless Networks, 2006 4th International Symposium on Boston, MA, USA, Piscataway, NJ, USA, IEEE, XP010933071, DOI: 10.1109/WIOPT.2006.1666484 ISBN: 978-0-7803-9549-7, Apr. 3, 2006, 9 pages.
Murty, et al., Dyson: An Architecture for Extensible Wireless LANs, Microsoft Research, Harvard University, 2010, 14 pages.
Mustafa, et al., Pre-Scanning and Dynamic Caching for Fast Handoff at MAC Layer in IEEE 802.11 Wireless LANs, NUST University Rawalpindi, Pakistan, 2005, 8 pages.
Nogueira, et al., Channel Selection Relying on Probabilistic Adjacent Channel Interference Analysis and Pattern Recognition, Wireless Personal Communication (2016), vol. 86(3), Jul. 30, 2015, pp. 1333-1357.
Office Action For Chinese Application No. 201880021005.9, mailed on Jan. 29, 2021, 14 pages (7 pages of English Translation and 7 pages of Official Copy).
Office Action For Chinese Application No. 201880022391.3, mailed on Feb. 26, 2021, 13 pages (9 pages of English Translation and 4 pages of Official Copy).
Office Action For Chinese Application No. 201880022734.6, mailed on Feb. 2, 2021, 13 pages (7 pages of English Translation and 6 pages of Official Copy).
Office Action received for Great Britain Patent Application No. 1816805.4, mailed on Jul. 29, 2021, 5 pages.
Office Action received for Great Britain Patent Application No. 1816806.2, mailed on Jul. 30, 2021, 5 pages.
Ong, et al., A Unified QoS-inspired Load Optimization Framework for Multiple Access Points Based Wireless LANs, Wireless Communications and Networking Conference, WCNC 2009, Apr. 5-8, 2009, pp. 1-6.
Ran2, Reply-LS on "subscriber type" indication via S1, 3GPP TSG RAN WG3 Meeting #59, Feb. 15, 2008, 1 page.
Romdhani, et al., Adaptive edcf: Enhanced Service Differentiation for IEEE 802.11 Wireless Ad-Hoc Networks, 2003 IEEE Wireless Communications and Networking Conference Record, Mar. 16-20, 2003, 6 pages.
S2-080718, Subscriber Type on S1, 3GPP TSG SA WG2 Meeting #62 Marina Del Rey, USA, Jan. 14-18, 2008, 2 pages.
Samsudin, et al., Least Congested Channel Recommendation for Uncoordinated Access Point, ICACT2017, Feb. 19-22, 2017, pp. 237-243.
Sauter, et al., Wireless Local Area Network (WLAN) in: Communication Systems for the Mobile information Society, John Wiley & Sons, Ltd, Chichester, UK, XP055140319, Doi: 10.1092/9780470933210, Jul. 14, 2006, pp. 217-248.
Search Report for Great Britain Application No. 1710046.2, mailed on Nov. 20, 2017, 4 pages.
Server Fault, Huge Outgoing traffic on windows azure [closed], http://unixhelp.ed.ac.uk/CGI/man-cgi?tc+8, 2015, 2 pages.
Siddiqui, et al., Mobility Management Across Hybrid Wireless Networks: Trends and Challenges, Elsevier, retrieved from http://www.sciencedirect.com on Oct. 6, 2005, 2006, 3 pages.
"Combined Search and Examination Report for Great Britain Application No. 2012473.1 mailed on Feb. 1, 2021", 7 pages.
"Examination Report for Great Britain Application No. 2012473.1 mailed on Oct. 5, 2022", 4 pages.
"International Preliminary Report on Patentability for Application No. PCT/EP2021/070811, mailed on Oct. 31, 2022", 8 pages.
"International Search Report and Written Opinion for International Application No. PCT/EP2021/070811 mailed on Nov. 5, 2021", 11 pages.
"Written Opinion of the International Preliminary Examining Authority for PCT/EP2021/070811, mailed on Jul. 20, 2022", 7 pages.
Bjornson, et al., "A New Look at Cell-Free Massive MIMO: Making It Practical with Dynamic Cooperation", "Annual International Symposium on Personal, Indoor and Mobile Radio Communications", Sep. 2019, 6 pages.
Bjornson, et al., "Scalable Cell-Free Massive MIMO Systems", arXiv:1908.03119v2, vol. 68, No. 7, May 8, 2020, 14 pages.
Lagen, et al., "Distributed User-Centric Clustering and Precoding Design for CoMP Joint Transmission", IEEE Global Communications Conference (GLOBECOM),, Dec. 6, 2015, 7 pages.
Ngo, H Q., et al., "Cell-Free Massive MIMO versus Small Cells", IEEE Transactions on Wireless Communications, vol. 16, No. 3, Jan. 17, 2017, 17 pages.

* cited by examiner

MEASURING CHANNEL PERFORMANCE IN WIRELESS LOCAL AREA NETWORKS

PRIORITY CLAIM

The present application is a National Phase entry of PCT Application No. PCT/EP2019/076815, filed Oct. 3, 2019, which claims priority from EP Patent Application No. 18200662.7, filed Oct. 16, 2018, each of which is hereby fully incorporated herein by reference.

TECHNICAL FIELD

This disclosure concerns wireless local area networks (WLANs). In particular, this disclosure relates to the performance of communication channels in a WLAN.

BACKGROUND

It is desirable for the quality of signals transmitted between devices in a WLAN be high enough to ensure effective transmission of data. To this end it is known to measure and compare the performance of the communication channels available within the WLAN, and to use only the better-performing channels in communications. Measuring the performance of a channel may include, for example, measuring the noise on the channel.

One known technique for measuring the performance of a channel is as follows. An access point communicates with a client device on a channel in the conventional way. When it is desired to obtain performance information in relation to other channels, communication on the working channel is paused while the access point performs a brief "scan" of the other channels. By "scan" it is meant that the access point switches through a series of channels, spending a fraction of a second on each and in that time making performance measurements. A disadvantage with such an approach is that it requires communication on the working channel to be paused. This results in a break in data flow which may be noticeable to a user.

SUMMARY

The present disclosure addresses and/or overcomes these and/or other disadvantages associated with the prior art.

According to a first aspect of the disclosure there is provided a method of measuring the performance of a first communication channel at a first access point in a WLAN, in which the first access point is associated to a client device so that the first access point can send data to, and/or receive data from, the client device on a second communication channel, the method comprising disassociating the first access point from the client device and associating a second access point to the client device; switching the working channel of the first access point from the second communication channel to the first communication channel; and making one or more performance measurements in respect of the first communication channel at the first access point.

A benefit of embodiments of the present disclosure is that it enables a method to be performed in which the clients of the first access point are "relocated" to the second access point in order to "free up" the first access point to make performance measurements on a desired channel. This has the benefit that performance measurements can be obtained from a desired channel more quickly than with known techniques as there is no need to wait until the access point becomes idle.

Dissociating the device from the first access point may take place before associating the device to the second access point.

The method may further comprise determining an appropriate access point in the WLAN to use as the second access point. This may involve determining which of the access points in the WLAN are capable of communicating with the client device. This may further involve determining which of the access points in the WLAN is most capable of communicating with the client device.

Sending data to, and/or receiving data from, the device at a second access point may take place on the working channel of the second access point.

The method may further comprise determining a working channel for the first access point. Determining a working channel for the first access point may take the performance measurements into account.

The method may include determining whether the first access point has a radio which is idle. If it is determined that the first access point has a radio which is idle, the method may include switching the working channel of the first access point to the first communication channel and making performance measurements in respect of the first communication channel.

The method may include identifying the first communication channel. This may include determining which of the first access point's channels has provided the least recent performance data. This may further include determining, from the multiple channels available to all access points in the WLAN, the channel and its corresponding access point for which the least recent performance data has been obtained.

Performance measurements may include measurements of the noise on a channel. Noise on the channel may include interference from sources including but not limited to microwave ovens and analogue TV senders. Alternatively or in addition, performance measurements may include measurements of the contention level on the channel. The contention level may be a measure of the amount of contending neighboring Wi-Fi traffic operating on the channel. Measuring the contention level may involve measuring the number of other access points operating on the channel in the vicinity of the access point at issue. Alternatively or in addition, performance measurements may include measurements of the access point's utilization of the channel. This may be a measure of the proportion of time during which the access point is actively sending or receiving data.

The method may further include comparing the performance of the first communication channel with the performance of the other channels available to the first access point. The working channel for the first access point may be chosen using this comparison. This comparison may involve determining a ranking score for the first communications channel and for the other channels available to the first access point. The ranking score for a given channel may be determined using the performance measurements associated with that channel.

Identifying a second access point may include determining which access point in the WLAN is best able to communicate with the client device. This may include the client measuring the signal strength of the access points in the WLAN and comparing the measured signal strengths. The first access point may instruct the client to make the signal strength measurements. This may be achieved by sending an 802.11k measurement request to the client. The client may report the results to the first access point which may report the results to a master access point. The master access point may compare the measurements and may perform the step of identifying a second access point using this comparison. In some embodiments there are a plurality of client devices. In these embodiments identifying a second access point includes determining which access point in the WLAN is best able to communicate with each of the client devices. Each feature mentioned in this description as relating to a client or a client device should be understood to also relate to a plurality of clients or client devices.

Communicating between the second access point and the device may comprise the device sending data to the second access point, the data being intended for transmission beyond the second access point. The data may be intended for transmission over the internet. Alternatively, the data may be intended for transmission to a destination on the local LAN. Communicating between the second access point and the device may comprise initiating communication between the second access point and the device on the working channel of the second access point.

The method may further comprise switching the working channel of the first access point back from the first communication channel to the second communication channel. Communication may then restart between the first access point and the device on the second communication channel. This may comprise dissociating the device from the second access point and may comprise re-associating the device with the first access point.

In some embodiments the method is repeated using a new first communication channel. In such embodiments the first access point may be a different access point to the first access point used in the first iteration of the method. The method may be repeated a plurality of times.

The method may further comprise identifying an access point in the WLAN for use as a proxy access point. The proxy access point may be the access point located closest to the first access point. Identifying the proxy access point may involve determining which access point has the highest signal strength as seen by the first access point. This determination may be made using RSSI measurements. The proxy access point may be the second access point.

The method may further comprise making performance measurements on the first communication channel at the proxy access point. This may include switching the working channel of the proxy access point to the first communication channel before making the performance measurements. The method may further comprise taking the performance measurements made by the proxy access point into account when determining a working channel for the first access point. In particular, the method may comprise using the performance measurements made by the proxy channel to determine a ranking score for the first communication channel. The ranking score may be compared with the ranking scores of other channels available to the first access point to determine a working channel for the first access point.

The master access point may instruct the proxy access point to make performance measurements on the first communication channel. The proxy access point may send the performance measurements to the master for processing.

Performance measurements may include measurements of the noise on the first communication channel. Noise on the channel may include interference from sources including but not limited to microwave ovens and analogue TV senders. Alternatively or in addition, performance measurements may include measurements of the contention level on the first communication channel. The contention level may be a measure of the amount of contending neighboring Wi-Fi traffic operating on the first communication channel. Measuring the contention level may involve measuring the number of other access points operating on the first communication channel in the vicinity of the proxy access point.

A further benefit of embodiments of the disclosure is that the performance measurements made by the proxy access point may be similar to those that would have been made by the first access point. This is particularly so if the proxy access point is experiencing similar environmental conditions to the first access point which may be the case, if, say, the proxy access point is located close to the first access point. Using a proxy access point in this way is particularly beneficial if it is not possible to "relocate" the clients of the first access point to the second access point. Such a situation could occur, for example, if the second access point does not have sufficient signal strength to communicate with the clients of the first access point.

In some embodiments the proxy access point is not idle and, instead, is communicating with a client device. In these embodiments the method may further comprise identifying a further access point that is capable of communicating with the client device of the proxy access point. The method may further comprise communicating between the further access point and the device. This may comprise disassociating the device with the proxy access point and associating the device to the further access point. Communicating between the further access point and the device may take place on the working channel of the further access point. The method may further comprise switching the working channel of the proxy access point to the first communication channel. The method may further comprise making performance measurements on the first communication channel. The method may further comprise terminating communication between the further access point and the device. This may comprise disassociating the device with the further access point. The method may further comprise re-starting communication between the proxy access point and the device. This may comprise re-associating the device to the proxy access point.

According to a second aspect of the disclosure there is provided a data carrier comprising machine-readable instructions for performing the method according to the first aspect of the disclosure.

According to a third aspect of the disclosure there is provided a WLAN having a first access point and a second access point; the first access point being configured to send data to, and/or receive data from, a client device on a second communication channel; the second access point being configured to send data to, and/or receiving data from, the client device; means for switching the working channel of the first access point from the second communication channel to the first communication channel; and means for making performance measurements in respect of the first communication channel.

BRIEF DESCRIPTION OF THE FIGURES

For illustration only, a specific embodiment of the disclosure will now be described in detail with reference to the accompanying drawings, in which.

DETAILED DESCRIPTION OF EMBODIMENTS

Figure 1:
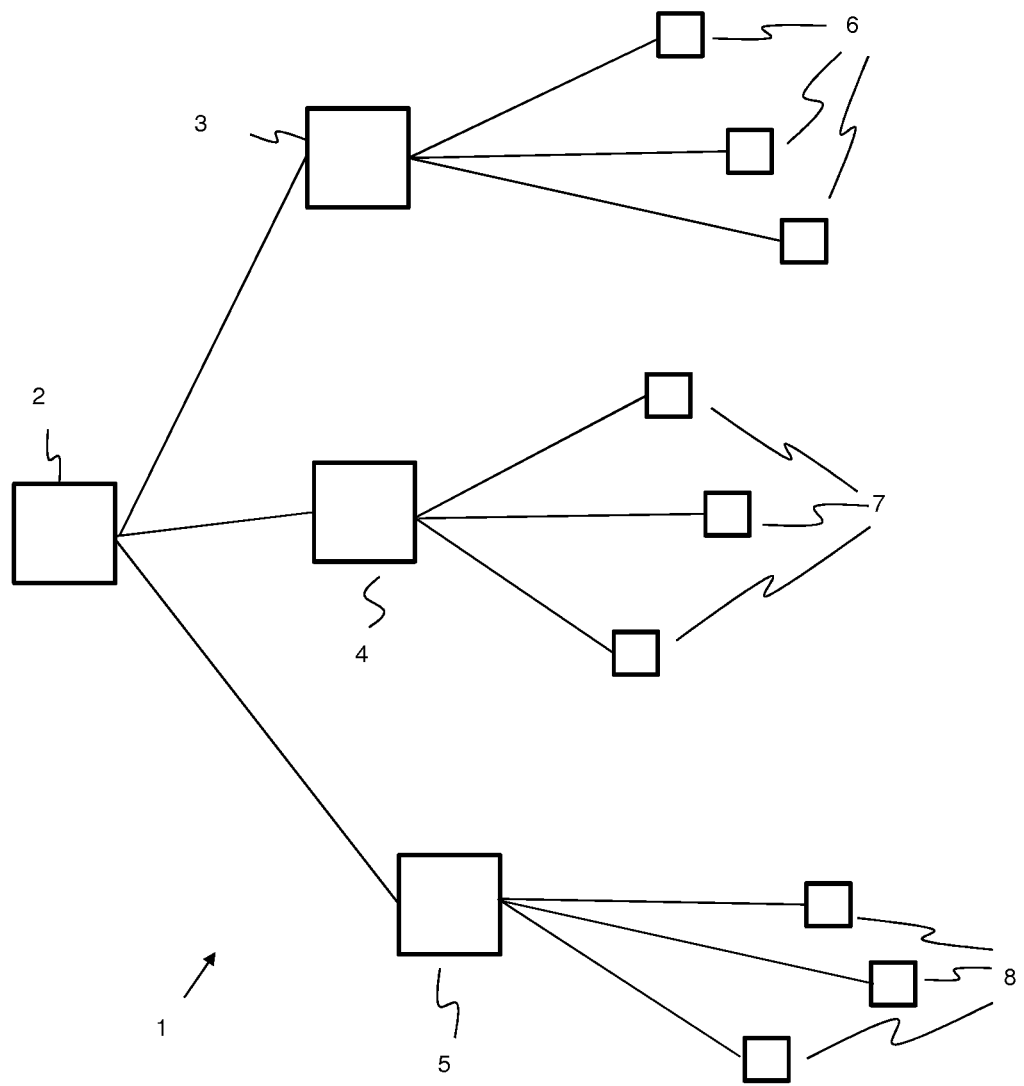
FIG. 1 is a schematic drawing of the network of the disclosure.

FIG. 1 shows a Wi-Fi network in accordance with the disclosure. There is a master access point 2 (which will be referred to as master AP 2) which can communicate wirelessly with three slave access points 3,4,5 (which will be referred to here as slaves 3,4,5). Slave 3 can communicate wirelessly with three client devices labelled 6 in FIG. 1. Slave 4 can communicate wirelessly with three client devices labelled 7 in FIG. 1. Slave 5 can communicate wirelessly with three client devices labelled 8 in FIG. 1. In the specific embodiment described here, each of the three slaves has one radio which it uses for communicating with its respective client devices.

Each slave 3,4,5 can communicate with its respective devices on one of several different channels within the frequency band of operation of that slave 3,4,5. The quality of each channel is primarily affected by two factors: interference (e.g. from microwave ovens and analogue TV senders); and other Wi-Fi traffic. These two factors reduce the quality of communication on a given channel. However, the extent to which the two factors reduce the quality of the channel varies from one channel to another and also varies over time. It is desirable for each slave to communicate with its clients on the best-performing channel in terms of signal quality.

To this end, each slave selects a particular channel as its working channel for a period of one week, for example. Therefore, for one week the slave 3 communicates with its clients 6 on that working channel. At regular intervals over the course of the week, the slave 3 measures the level of noise on the working channel, the level of neighbor contention on the working channel and its "own utilization ". By neighbor contention level it is meant the proportion of the time that slaves other than the slave 3 and its associated clients are putting sufficient energy onto the channel that the channel appears busy and transmission between the slave 3 and its clients 6 is not possible. The "own utilization " measurement is the amount of time that data is being transmitted from or received by the slave 3. Specifically, this is the proportion of each minute that the slave 3 is sending or receiving data.

The slave 3 sends the measured data to the master 2. The master 2 uses the measured data to determine the average noise level and neighbor contention level for the slave 3. When the week has elapsed, the slave 3 switches its radio to a different channel and proceeds to communicate with its clients 6 on that channel for one week. Over the course of that week, the slave 3 makes regular measurements of the noise and contention levels and sends them to the master 2. This process repeats using each of the slave's available channels as the working channel in accordance with a schedule. The master 2 compares the determined average noise level for each channel and also compares the determined average contention level for each channel from these comparisons determines the worst performing channel. The slave 3 then cycles through each of the channels again, each for one week as before, except for the determined worst performing channel which is left out of this cycle. As in the first cycle, the slave 3 makes noise and contention measurements for each working channel which are averaged and compared as before. As before, the worst performing channel is excluded from the subsequent cycle.

If, at the end of each week-long period, a working channel is in use (i.e. not idle) then the change in working channel is delayed. Furthermore, if a channel has been excluded from the cycle for some time, the master 2 will not have any recent performance data in respect of that channel. For these reasons, it may be that the master has received insufficient recent noise and contention data in respect of one or more channels to enable it to make a meaningful performance comparison between all the channels. Therefore, the master 2 monitors the amount of performance data it has received from the slaves and identifies one channel of one slave in respect of which it has received the least recent performance data. This channel will be referred to as the "target channel" and the slave as the "target slave". In this description, slave 3 will be considered to be the target slave.

The master 2 asks the target slave 3 whether or not its radio is idle. If the radio is idle, the master 2 instructs the target slave 3 to switch its radio to the target channel for a period of time, and to make performance measurements on the target channel over the course of that period. When the period has elapsed, the target slave 3 returns to its normal channel schedule.

The target slave 3 sends the measured performance data to the master 2 which uses it in the channel performance comparison process referred to above.

Figure 2:
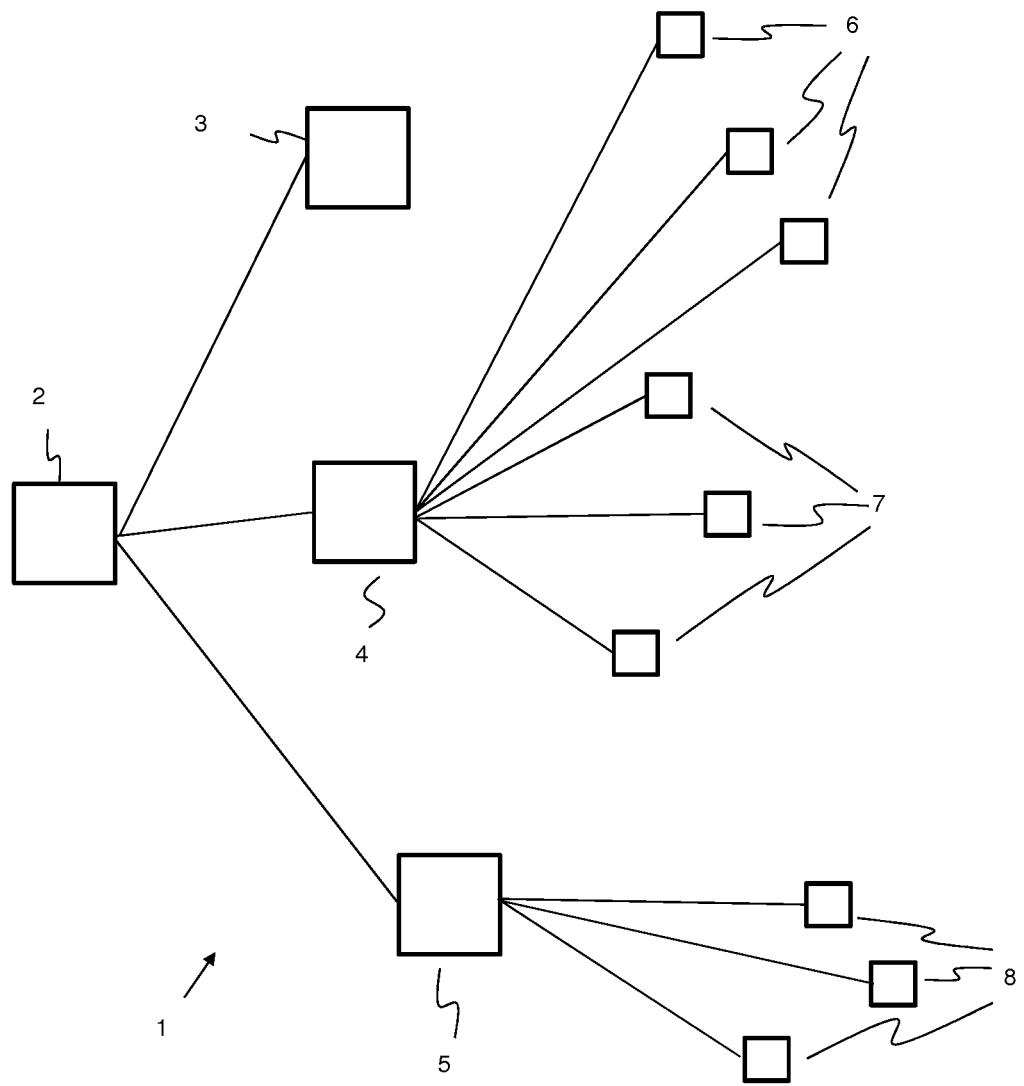
FIG. 2 is a schematic drawing of the network of the disclosure after certain method activities according to the disclosure have been performed.

If the target slave's radio is not idle, the master 2 instructs the target slave 3 to test whether the target slave's clients would be able to switch to communicating with one or more of the other slaves 4,5 rather than the target slave 3. The target slave 3 does this by sending an 802.11k measurement request to each client 6, asking it to measure and report the signal strength at which it sees each of the other slaves 4,5. The target slave 3 reports this information to the master 2. If the signal strength is sufficient for the clients 6 to switch to another slave(s), the master instructs the target slave 3 to switch its clients 6 to that other slave(s) using 802.11v BSS transition requests. The target slave 3 does so, then switches its radio to the target channel for a period of time and makes performance measurements on the target channel over the course of that period. This situation is shown in FIG. 2. The target slave 3 sends the measured performance data to the master 2 which uses it in the channel performance comparison process referred to above. When the period has elapsed, the target slave 3 returns to its normal channel schedule. The master 2 then performs a load-rebalancing procedure which may involve switching the clients which were moved to a different slave back to the target slave 3. That procedure will not be described in detail here.

If it is not possible to switch the clients 6 to a different slave 4,5, the master determines which of the other slaves 4,5 is located nearest to the target slave 3. The master 2 does this by analyzing RSSI measurements for signals sent between the target slave 3 and neighboring slaves 4,5. The slave determined as the nearest to the target slave 3 will be referred to as the proxy slave. In the presently described embodiment, slave 4 is the proxy slave.

The master 2 asks the proxy slave 4 whether or not its radio is idle. If the radio is idle, the master 2 instructs the proxy slave 4 to switch its radio to the target channel for a period of time, and to make performance measurements on the target channel over the course of that period. When the period has elapsed, the proxy slave 4 returns to its normal channel schedule. The proxy slave 4 sends the measured performance data to the master 2 which uses it in the channel performance comparison process referred to above.

Figure 3:
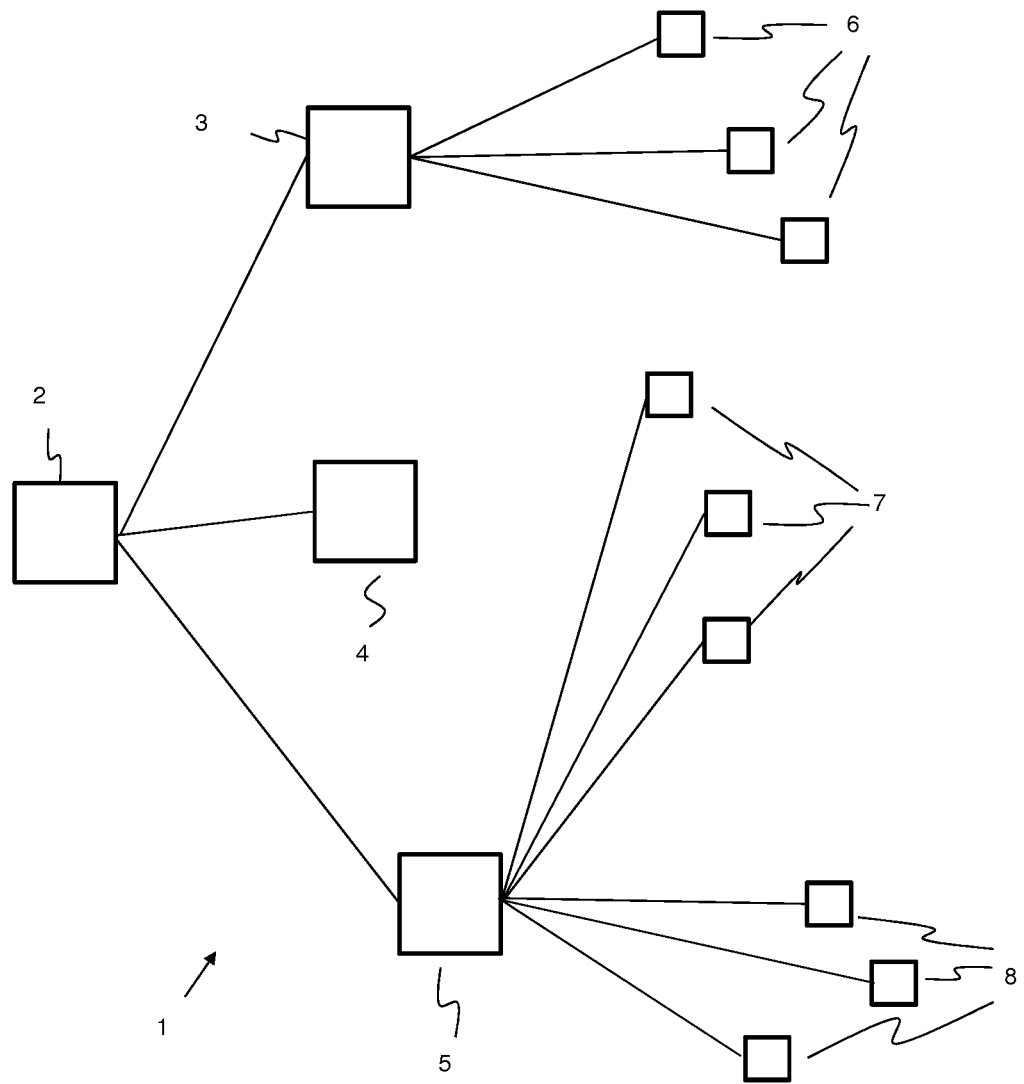
FIG. 3 is a schematic drawing of the network of the invention after other method activities according to the disclosure have been performed.
Figure 4:
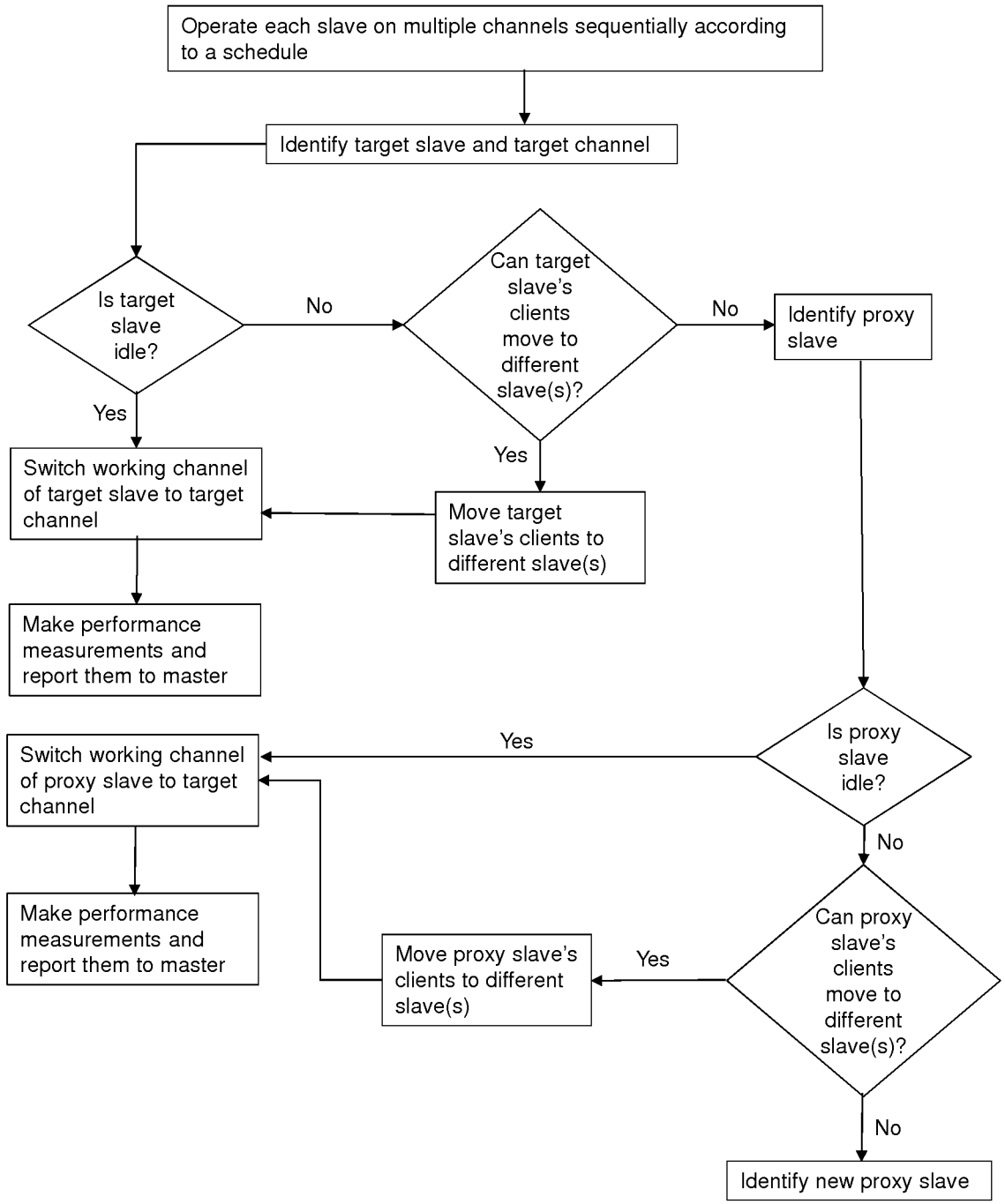
FIG. 4 is a flow chart showing the method of the disclosure.

If the proxy slave's radio is not idle, the master 2 instructs the proxy slave 4 to test whether the proxy slave's clients would be able to switch to communicating with one or more of the other slaves 4,5 rather than the proxy slave 4. The proxy slave 4 does this by sending an 802.11k measurement request to each client 7, asking it to measure and report the signal strength at which it sees each of the other slaves. The proxy slave 4 reports this information to the master 2. If it is possible for the clients 7 to switch to another slave(s), the master instructs the proxy slave 4 to switch its clients to that other slave(s) using 802.11v BSS transition requests. The proxy slave 4 does so, then switches its radio to the target channel for a period of time and makes performance measurements on the target channel over the course of that period. This situation is shown in FIG. 3. In FIG. 3, the proxy slave 4 has switched its client to slave 5. When the period has elapsed, the proxy slave 4 sends the measured performance data to the master which uses it in the channel performance comparison process referred to above.

As proxy slave 4 is located in the vicinity of target slave 3, the communication conditions experienced by proxy slave 4 are similar to those experienced by target slave 3. Therefore, the averaged noise and contention measurements that the master 2 obtains using the proxy slave's performance data will be similar to those which it would have obtained had it used the target channel's performance data. Therefore, the master 2 uses the averaged noise and contention measurements obtained using the proxy slave's data as if they had been obtained using the target slave's data in the channel performance comparison process referred to above.

When the period has elapsed, the proxy slave 4 returns to its normal channel schedule. The master 2 then performs a load-rebalancing procedure which may involve switching the clients which were moved to a different slave(s) back to the proxy slave 4. This procedure will not be described in detail here.

If it is not possible to switch the clients to a different slave, the master determines which slave other than the proxy slave 4 is the next nearest to the target slave 3. The master 2 does this by analyzing RSSI measurements for signals sent between the target slave 3 and its neighboring slaves. The process described above is then repeated with this newly identified slave as the proxy slave.

The invention claimed is:

1. A method of measuring performance of a first communication channel at a first access point in a wireless local area network (WLAN), in which the first access point is associated to a client device so that the first access point can send data to, or receive data from, the client device on a second communication channel, the method comprising:
   switching a proxy working channel of a proxy access point to the first communication channel;
   making one or more proxy performance measurements of the first communication channel at the proxy access point after switching the proxy working channel to the first communication channel;
   disassociating the first access point from the client device and associating a second access point to the client device;
   switching a working channel of the first access point from the second communication channel to the first communication channel after disassociating the first access point from the client device; and
   making one or more performance measurements in respect of the first communication channel at the first access point.

2. The method as claimed in claim 1, further comprising determining the working channel for the first access point.

3. The method as claimed in claim 2, wherein determining the working channel for the first access point takes the one or more performance measurements into account.

4. The method as claimed in claim 1, further comprising identifying the first communication channel.

5. The method as claimed in claim 4, further comprising determining which channel of the first access point has provided the least recent performance data.

6. The method as claimed in claim 1, wherein the one or more performance measurements include measurements of noise on a channel.

7. The method as claimed in claim 1, wherein the one or more performance measurements include measurements of a contention level on a channel.

8. The method as claimed in claim 1, the method further comprising determining an appropriate access point in the WLAN to use as the second access point.

9. The method as claimed in claim 8, further comprising determining which access points in the WLAN are capable of communicating with the client device.

10. The method as claimed in claim 8, further comprising determining which access point in the WLAN is most capable of communicating with the client device.

11. The method as claimed in claim 1, wherein the communicating between the second access point and the client device comprises the client device sending data to the second access point, the data being intended for transmission beyond the second access point.

12. The method as claimed in claim 1, the method further comprising switching the working channel of the first access point back from the first communication channel to the second communication channel.

13. A non-transitory computer-readable storage medium storing machine-readable instructions for, when loaded on a computer and executed thereby, performing the method as claimed in claim 1.

14. A wireless local area network (WLAN) comprising: a first access point and a second access point, the first access point being configured to send data to, or receive data from, a client device on a second communication channel, the second access point being configured to send data to, or receive data from, the client device; means for switching a proxy working channel of a proxy access point to a first communication channel; means for making one or more proxy performance measurements of the first communication channel at the proxy access point after switching the proxy working channel to the first communication channel; means for switching a working channel of the first access point from the second communication channel to the first communication channel after disassociating the first access point from the client device; and means for making performance measurements in respect of the first communication channel.

* * * * *